April 12, 1966     D. C. YOUNG     3,245,904
FIRE RETARDANT

Filed July 3, 1962     3 Sheets-Sheet 1

INVENTOR.
DONALD C. YOUNG
BY
*Robert Shaw*
ATTORNEY

April 12, 1966  D. C. YOUNG  3,245,904
FIRE RETARDANT

Filed July 3, 1962  3 Sheets-Sheet 3

INVENTOR.
DONALD C. YOUNG
BY
ATTORNEY

United States Patent Office 3,245,904
Patented Apr. 12, 1966

---

3,245,904
FIRE RETARDANT
Donald C. Young, Fullerton, Calif., assignor to Union
Oil Company of California, Los Angeles, Calif., a corporation of California
Filed July 3, 1962, Ser. No. 207,287
9 Claims. (Cl. 252—7)

This invention relates to fire retardants and extinguishants and, in particular, to compositions which are eminently suited for the aerial bombardment of forest and brush fires.

Effective fire retardants and extinguishants should possess a high chemical retardancy, i.e., alter the nature of combustion by reducing the amount of combustible matter, and/or possess a high heat absorptivity to quench the fire. For use in aerial bombardment, such compositions should also have a highly viscous to gelatinous nature to prevent air currents from dispersing the liquid.

Various compositions have been proposed to combat forest and brush fires; however, all these compositions have some undesirable features. Although they have little chemical retardancy, aqueous suspensions of calcium borate are presently the most widely used because they have a very high heat absorptivity. The chief objection to these compositions, however, is that they sterilize the soil and prevent reforestation of burned areas for several years. Because forest and brush fires occur predominately in mountainous terrain, the inability to grow vegetation in the sterile soil often results in serious flood damage during heavy rains.

Aqueous solutions of diammonium orthophosphate with viscous additives, e.g., sodium alginates, carboxymethyl cellulose, etc., have also been proposed; these materials possessing the well known chemical fire retardancy of orthophosphate. These solutions are not ideally suited for this use as they require large amounts of viscous additives, are highly corrosive to aluminum and are limited in solute content to less than about 10 weight percent phosphorus as $P_2O_5$.

It is an object of this invention to provide a composition which has a high fire retardancy and which is not a soil sterilant.

It is also an object of this invention to provide such a composition with a high viscosity for use in aerial bombardment of forest and brush fires.

Other and related objects will be apparent from the following discussion.

I have discovered that mixtures of monoammonium orthophosphate, diammonium orthophosphate and a calcium salt, e.g., calcium chloride form very viscous or gelatinous liquids which possess a high degree of fire retardancy.

I have also discovered that the aforementioned compositions are substantially non-corrosive to aluminum and that the addition of minor amounts of a soluble chromate salt renders the compositions non-corrosive to ferrous metals also.

I have further discovered that replacement of all or a portion of the orthophosphate content of the aforementioned compositions with molecularly dehydrated phosphates such as pyrophosphate, tripolyphosphates, tetrapolyphosphates, etc., substantially improves the chemical fire retardancy of the compositions. Accordingly, a preferred composition also contains molecularly dehydrated phosphates.

The aforementioned compositions are ideally suited for fire retardants and extinguishants because they possess a very high chemical fire retardancy, a moderate heat absorptivity and a high viscosity. Because the components of the solution are all plant nutrients and are washed into the soil, regrowth of vegetation in burned areas is enhanced, in marked contrast to the stirlant affect of the commonly used borate solutions. Finally, extensive mechanical equipment necessary to provide and maintain borate suspensions and diammonium orthophosphate solutions is eliminated because the viscous liquids of my invention can be obtained by metering aqueous solutions of ammonium phosphates and of a calcium salt directly into the airplane's tanks.

My invention will now be described by reference to the figures of which:

Figure 1:
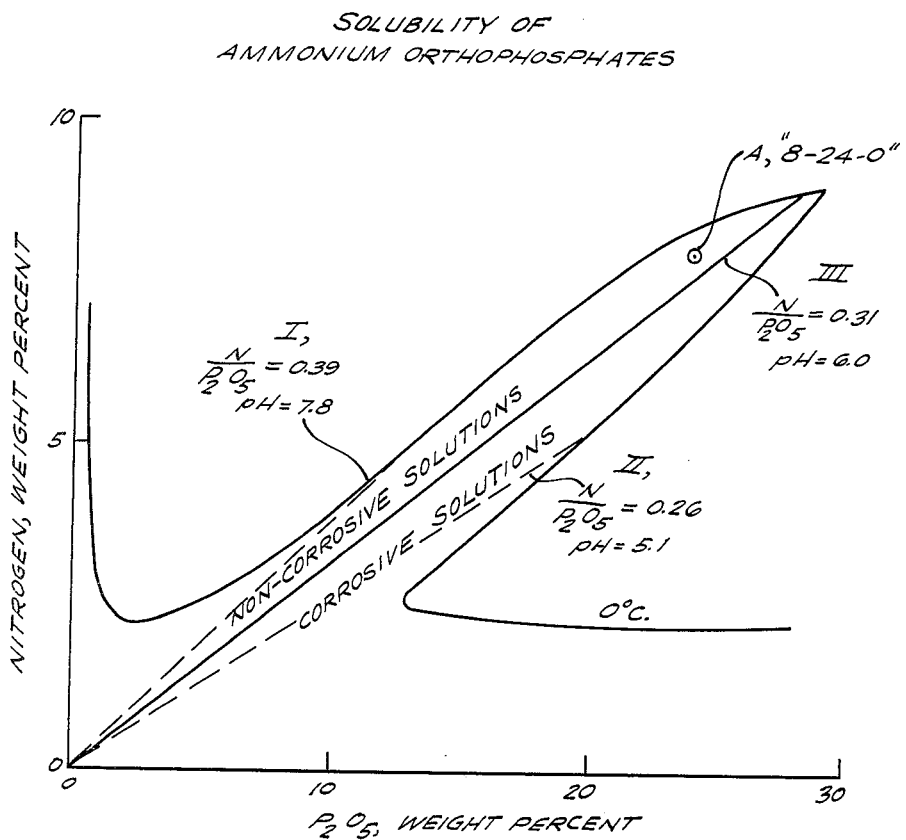
FIGURE 1 illustrates the solubility of ammonium phosphates.

Referring now to FIGURE 1, there is illustrated the solubility of the ammonium phosphate solutions which comprise the base to which a calcium salt is added to form my fire retardants. These base solutions are aqueous solutions of monoammonium and diammonium orthophosphates. Typical of such base solutions is the commercially available material designated in the fertilizer trade as "8-24-0," represented on FIGURE 1 as point A and containing 8 weight percent nitrogen in the form of ammonium and 24 weight percent phosphorus expressed as the anhydride, $P_2O_5$.

The ammonium phosphate solute in the solutions shown in FIGURE 1 have an average composition designated by the following emperical formula:

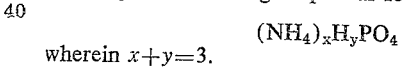

$$(NH_4)_xH_yPO_4$$

wherein $x+y=3$.

The region beneath and within the isotherm represents liquid solutions at or above 0° centigrade, while the region above and outside the curve represents a mixed solid-liquid system. Straight lines on this plot which intersect the origin represent a fixed ratio of nitrogen to phosphorus in the solution. In general, solutions useful as bases for my fire retardant are within the protrusion of the isotherm and are between the straight lines I and II. Expressed in terms of their nitrogen to phosphorus weight ratio, calculated at $P_2O_5$, the composition of the ammonium orthophosphates is from 0.26 to 0.39, preferably 0.31 to 0.39. The values of $x$ in the preceding formula are from 1.35 to 2.0; that of $y$ from 1.0 to 1.65 and for the preferred composition the values are between 1.6 and 2.0 for $x$ and between 1.0 and 1.4 for $y$. The pH of these solutions is about neutral, between 5.1 and 7.8. Preferably, the base solutions are non-corrosive to mild steel and have a value of $x$ equal to or greater than 1.6, line III, corresponding to a minimum pH of 6.0.

As previously mentioned, a suitable solution of ammonium phosphates is available as an "8-24-0" composition; point A on FIGURE 1. The composition and concentration of this solution can be varied as desired within the aforementioned limits by addition of ammonia, water and/or phosphoric acid. Briefly, these solutions are obtained by neutralization of phosphoric acid of strengths between about 25 and 71 weight percent phosphorus (as $P_2O_5$) with anhydrous or aqua ammonia. The heat of neutralization can be removed by indirect heat exchange or by flashing a portion of the water content of the neutralization zone. The reactants are admixed in suitable proportions to obtain an aqueous solution having a pH between about 5.1 and about 7.8; preferably the solution's pH is between about 6.0 and 7.8.

Figure 2:
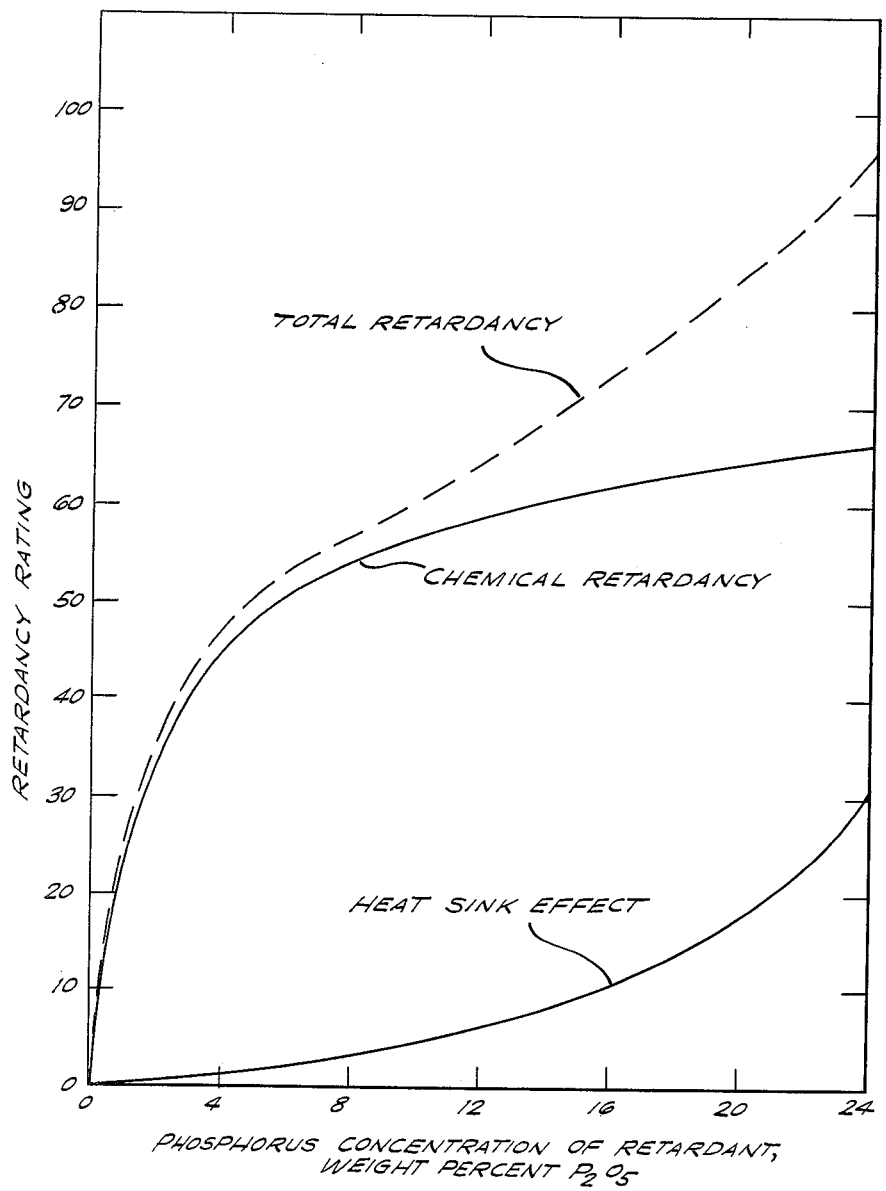
FIGURE 2 illustrates the fire retardancy of ammonum phosphate solutions as a function of their solute content.

FIGURE 2 illustrates the chemical fire retardancy, the heat absorptivity and the total fire retardancy of the aforedescribed ammonium phosphate solutions as a function of solute concentration. From this figure it can be seen that the concentration of the aforedescribed ammonium phosphate solute in the aqueous solution should be sufficient to provide a phosphorus content (calculated as $P_2O_5$) which is greater than about 2 weight percent and preferably, is at least about 4 weight percent. The maximum solute content is preferably no greater than about 24 weight percent; however, in some instances this limit will be determined only by the maximum solubility and solutions having up to about 35 wight percent phosphorus (as $P_2O_5$) can be used where ambient temperatures less than about 20° C. are not expected to be encountered.

While the aforementioned ammonium orthophosphate solutions are well suited as bases for the preparation of my fire retardant compositions, I prefer to employ solutions in which a portion of the orthophosphate is replaced with molecularly dehydrated acyclic polyphosphate.

Figure 3:
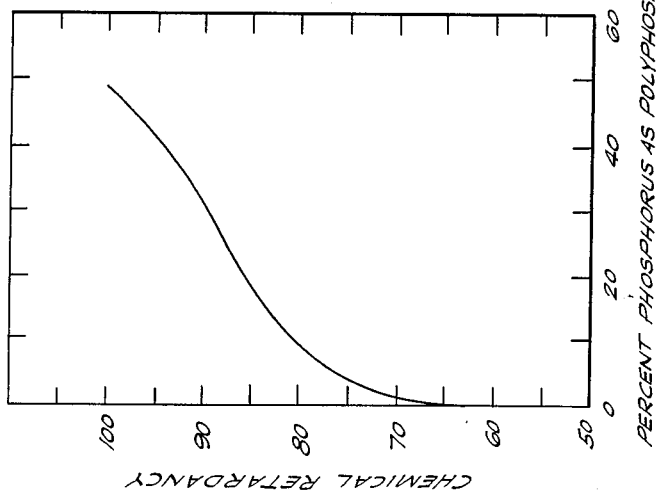
FIGURE 3 illustrates the effect of molecularly dehydrated polyphosphates on the chemical fire retardancy of fire retardants of the invention.

FIGURE 3 illustrates the effect which the molecularly dehydrated acyclic polyphosphates exhibit on the chemical fire retardancy of the compositions of my invention. In FIGURE 2 the percent effectiveness of the compositions under investigation are plotted as a function of the percent of phosphorus in the base solution which is in the form of molecularly dehydrated polyphosphates. The chemical retardancy test is described hereinafter in greater detail, briefly however, it represents the degree to which combustibles are reduced to a non-volatile char, 100% effectiveness being achieved when the weight of char formed from the combustible matter is equal to the weight of the uncharred combustible matter.

From FIGURE 3, it can be seen that the acyclic polyphosphates greatly increase the chemical retardancy, i.e., the charring effect, of my compositions. In general, I prefer to employ compositions which have at least 5 weight percent and preferably at least 35 weight percent of their phosphorus content as an acyclic polyphosphate.

The acyclic polyphosphates can be provided in the aforedescribed base solutions by the addition of a soluble polyphosphate salt thereto or by concentration of the phosphoric acid to between about 71 and about 80 weight percent phosphorus (as $P_2O_5$) prior to neutralization with ammonia. Examples of acyclic polyphosphates are the following: pyrophosphate, tripolyphosphate, tetrapolyphosphate, pentapolyphosphate, hexapolyphosphate, heptapolyphosphate, etc.; the foregoing species being listed in order of increased molecular dehydration states of orthophosphate from which they are common derived.

Alkali metal and ammonium salts of some or all the aforementioned polyphosphates are commercially available. Representative of such are the following: tetrasodium pyrophosphate, disodium dihydrogen pyrophosphate, pentapotassium tripolyphosphate, sodium tripolyphosphate, cesium hydrogen tripolyphosphate, lithium sodium tetrapolyphosphate, lithium hydrogen pentapolyphosphate, etc.

Aqueous solutions of ammonium salts of the aforementioned acyclic polyphosphates are also available or can be readily obtained by ammonia neutralization of furnace grade or wet process phosphoric acids having concentrations between about 71 and about 80 percent phosphorus (expressed as $P_2O_5$). These solutions are obtained with pH values between about 6.0 and about 8.0 in concentrations up to about 60 weight percent solute content. The solute comprises between about 30 and about 95 percent of ammonium orthophosphate salts, the remainder being ammonium acyclic polyphosphate salts which are present in the following percentages:

Ammonium pyrophosphates: 3 to 47
Ammonium tripolyphosphates: 2 to 30
Ammonium tetrapolyphosphates: 0 to 15
Ammonium pentapolyphosphates: 0 to 11
Ammonium hexapolyphosphates: 0 to 9
Ammonium heptapolyphosphates: 0 to 7

The aforementioned aqueous solutions of ammonium ortho- and polyphosphates can be used directly as the base in the preparation of my fire retardant compositions, or if desired, can be blended with solutions of ammonium orthophosphates to reduce the polyphosphate content in the base solution.

Fire retardants prepared from the ammonium phosphate solutions derived from wet-process phosphoric acid which are described in my copending application, Serial No. 116,161, now Patent 3,044,851, exhibit a greater fire retardancy than do solutions of ammonium phosphate derived from furnace grade phosphoric acid. Accordingly, these solutions comprise a preferred base stock for preparation of the fire retardants of my invention. The phosphate content of these solutions, expressed as $P_2O_5$ is between about 5 and 40 weight percent of which between about 95 and about 20 weight percent is present as orthophosphate, the remainder being present as molecularly dehydrated acyclic polyphosphates. The solutions have a pH between about 5.5 and about 10.0 with between about 0.5 and about 0.25 part of ammonia (calculated as nitrogen) per part of phosphorus (calculated as $P_2O_5$). Because the solutions are derived from wet process phosphoric acid, they contain the impurities incident in such acid; between about 0.5 and about 10.0 weight percent calculated as the oxides of metal cations which are complexed by the acyclic polyphosphate. These impurities generally comprise iron and aluminum wtih lesser amounts of magnesium, copper, zinc, vanadium, and chromium.

Viscous fire retardants of my invention are obtained by the addition of calcium cations to the aforedescribed base stocks in amounts comprising between about 0.05 and about 3.0 weight percent of the retardant, calculated as calcium oxide. At the pH conditions of the solutions, i.e., between about 5.1 and about 7.8, calcium ions form insoluble phosphate salts which are very flocculent and which impart a substantial viscosity increase to the liquids.

In general, any water soluble salt of calcium can be used as a source of calcium ions. Illustrative, but not inclusive of such salts are the following: calcium acetate, calcium bromide, calcium chlorate, calcium perchlorate, calcium chloride, calcium chromate, calcium ferrocyanide, calcium formate, calcium iodide, calcium isobutyrate, calcium α-methylbutyrate, calcium nitrate, calcium nitrite, calcium propionate, etc. Because it is readily available, calcium chloride is the preferred source of calcium ions.

Figure 4:
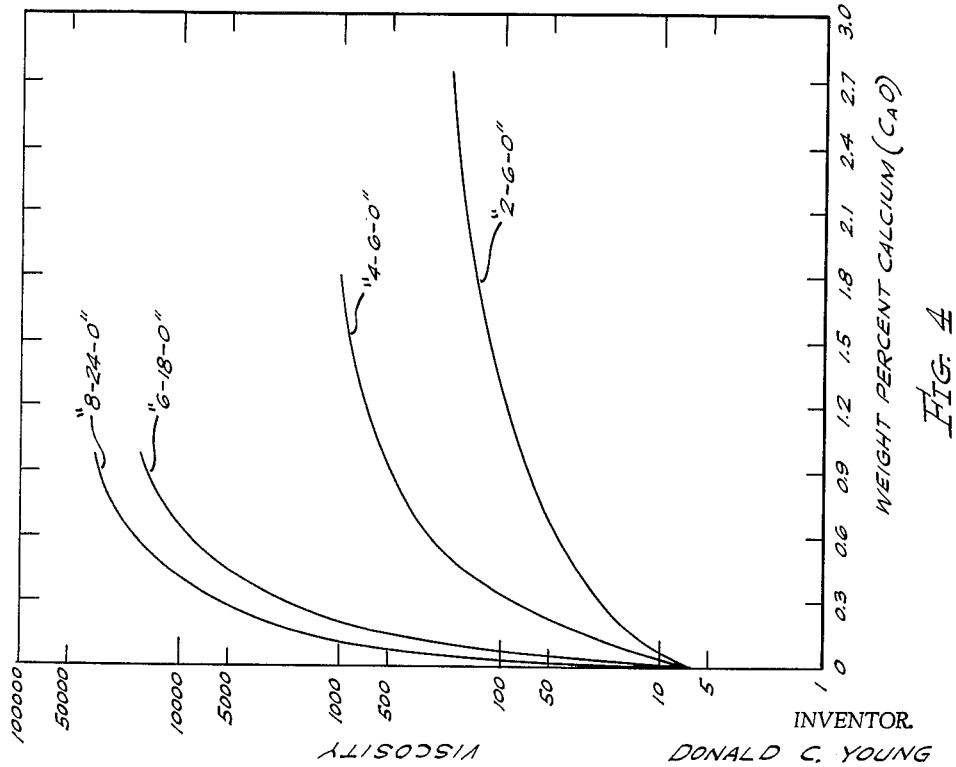
FIGURE 4 illustrates the viscous effect of calcium salt addition to ammonium phosphate solutions.

FIGURE 4 illustrates the effect that addition of calcium ions has on the viscosity of the aforementioned base solutions. In this figure, the viscosities of the composition one hour after addition of a calcium salt is plotted as a function of the amount of calcium added. From this figure, it is apparent that addition of minor amounts of calcium, preferably amounts between about 0.1 and about 2.0 weight percent calculated as the oxide results in an extreme increase in the solutions' viscosity. While other cations particularly iron and aluminum also form gelatinous precipitates in ammonium phosphate solutions they do not result in comparable increases in the liquid's viscosity. To illustrate the maximum viscosity that can be obtained with an iron salt addition is about 200 cps. and with an aluminum salt addition is about 500 cps.

While ammonium phosphate solutions with pH values above about 6.0 are normally inert to ferrous metals and highly corrosive to aluminum, I have discovered that the viscous retardants of my invention are only slightly corrosive to aluminum but are very corrosive to ferrous metals, e.g., carbon steels. To reduce corrosion of ferrous metals by the viscous retardants, soluble chromate salts are added in amounts comprising between about 0.001 and 0.05; preferably between about .005 and about 0.2 weight percent of the liquid composition. In general, any soluble chromate or dichromate salt can be used. These water soluble salts include the alkali metal and ammonium chromates. Examples of suitable salts are sodium chromate, potassium dichromate, lithium dichromate, cesium chromate, ammonium dichromate, etc.

The soluble chromate salt can be added prior to, simultaneously with, or after addition of the calcium salt to the base solution. In a preferred embodiment, the soluble chromate salt and calcium salt are admixed in an additive solution which is thereafter added to the ammonium phosphate base solution immediately prior to use. The chromate salt greatly reduces ferrous metal corrosion by the viscous retardants and also imparts a yellow to orange color to the liquid, thereby permitting visual observation of the aerial drops of retardant.

The calcium salt and chromate can be added to the aqueous ammonium phosphate base as solids or, preferably, as aqueous solutions. In general, I prefer to admix between about 0.5 and about 10 volumes of a calcium salt solution containing between about 5 and about 45 weight percent calcium (calculated as CaO) with 100 volumes of base aqueous ammonium phosphate solution so as to obtain a calcium concentration between about 0.05 and 3.0 weight percent (calculated as CaO). Prior to or during addition of the calcium solution, I prefer to add between about 0.001 and about 1.0 volume of an aqueous chromate salt solution containing between about 2 and about 30 weight percent chromate (calculated as $Cr_2O_3$) with 100 volumes of the base ammonium phosphate solution.

The calcium phosphate precipitate forms immediately upon addition of the calcium salt and achieves maximum viscosity within a period from about 5 minutes to an hour. The liquids are quite stable and can be stored for periods of weeks without any significant phase separation. Preferably, however, the calcium salt is added shortly prior to use of the retardant.

The following will illustrate the preparation of my fire retardants and describe the test procedures used in evaluation of the solutions.

A solution of ammonium orthophosphates having an "8-24-0" composition was divided into four portions of successive dilutions to prepare "6-18-0," "4-12-0" and "2-6-0" solutions. A saturated solution of calcium chloride (43 weight percent solute) was prepared and added in varied amounts to samples of each ammonium phosphate concentration. The admixtures were stirred slowly and tested for viscosity at incremental periods. In most instances, the viscosity of the liquids rose rapidly within five minutes after admixture and achieved their ultimate viscosity in 15 to 60 minutes. Because of the highly thixotropic nature of the liquids, a Brookfield viscometer was used at room temperature at a spindle speed of 20 revolutions per minute. All determinations were made on the fourth revolution of the spindle. The results of these viscosity tests appear in FIGURE 3. With the two most concentrated solutions, "8-24-0" and "6-18-0," the addition of the calcium salt solution in amounts greater than about 0.7 weight percent calcium (as CaO) set the liquid into a firmly gelled solid and prevented viscosity determinations. For comparison, a solution of carboxyl methyl cellulose in a 12 weight percent diammonium phosphate solution produced a liquid with a maximum 3200 centipoise viscosity.

Other thixotropic additives were also evaluated and the following table summarizes the results.

*Table 1*

| Additive | | Base solution | Ultimate viscosity, centipoises |
|---|---|---|---|
| Identity | Weight percent [1] | | |
| Bentonite clay | 40 | "6-17.25-0" [2] | 1,000 |
| Do | 50 | "6-17.25-0" [2] | 45,000 |
| Do | 20 | "4-11.5-0" [2] | 5,500 |
| Do | 30 | "4-11.5-0" [2] | 19,000 |
| Do | 40 | "4-11.5-0" [2] | 41,000 |
| Do | 20 | "8-24-0" | 25,000 |
| Do | 20 | "8-24-0" | 6,000 |
| $FeCl_3$ | 11.7 | "8-24-0" | 200 |
| $Fe(NO_3)_3$ | 7.0 | "8-24-0" | 200 |
| $Al(NO_3)_3$ | 22.2 | "8-24-0" | 500 |
| $Fe_2(SO_4)_3$ | 17.2 | "8-24-0" | 200 |
| Cab-O-Sil [3] | 6.1 | "8-24-0" | 10,000 |
| Do [3] | 4.6 | "8-24-0" | 1,800 |
| Do [3] | 3.5 | "8-24-0" | 100 |
| Do [3] | 6.1 | "4-12-0" | 16,000 |
| Do [3] | 4.6 | "4-12-0" | 9,500 |
| Do [3] | 3.5 | "4-12-0" | 100 |
| $CaCl_2$ | 0.4 | $(NH_4)_2HPO_4$ | 10 |
| | 0.8 | $(NH_4)_2HPO_4$ | 600 |
| | 1.6 | $(NH_4)_2HPO_4$ | 2,000 |
| Sodium alginate | 10.0 | "8-24-0" | 10,000 |

[1] Metal salts expressed as oxides.
[2] Obtained from a wet-process ammonium phosphate containing 6 percent of its phosphorus content as acyclic polyphosphates and about 5 weight percent metallic impurities comprising iron, aluminum, magnesium, chromium and zinc.
[3] A finely divided, micron sized silica.

Fire retardancy tests were performed by thoroughly wetting cotton strips (½ by 4 inches) with the retardants, drying the cotton and charring the dried strip in a furnace at 700° C. and 0.7 mm. of mercury pressure for twenty minutes. The resulting char was weighed and used to evaluate the retardant; high char weights indicating a high chemical fire retardancy. The amount of inorganic residue contributed by the fire retardant was determined by treating a sample of the retardant in the furnace under identical conditions. The weight of inorganic residue was then subtracted from the cotton char weight to correct the latter and indicate only the weight of combustible matter which was charred.

The ratio of corrected char weight to weight of the cotton strip indicated the chemical effect the retardant exhibts on combustion. The ratio of inorganic residue to weight of fuel (cotton) was also determined to evaluate the heat absorptivity, i.e., heat sink, of the fire retardant.

The aforedescribed procedure was performed on a series of fire retardants of my invention and on the commonly used calcium borate retardant. The results are summarized in the following table:

*Table 2*

| Fire retardant | Chemical retardancy | Heat absorptivity | Total |
|---|---|---|---|
| 8-24-0 | 62.9 | 30 | 92.9 |
| 8-24-0+0.5% Ca (as CaO) | 48.3 | 21.7 | 70.0 |
| 4-12-0 | 57.8 | 7 | 64.8 |
| 4-12-0+1.8% Ca (as CaO) | 64.8 | 41.2 | 106.0 |
| 8-24-0 (6% as polyphosphate) | 80.0 | 27.9 | 107.9 |
| 8-24-0 (28% as polyphosphate) | 88.2 | 17.5 | 105.7 |
| 8-24-0 (44% as polyphosphate) | 100.0 | 17.5 | 117.5 |
| Calcium borate (32%) | 20.8 | 78.6 | 99.4 |

From the preceding table, it is evident that the fire retardants of my invention have a very high chemical fire retardancy and a moderate heat absorptivity. To further increase the heat absorptivity of this retardant it is within the scope of my invention to add between about 5 and about 25 weight percent of various inert solids (heat sinks) such as finely divided silica, alumina, clays, e.g., montmorillonites, hectorites, saponites, kaolins, micas, etc. The highly viscous retardants are ideal suspending mediums for such solids because of their highly gelatinous consistency.

Corrosion tests were conducted on the fire retardants of my invention by immersing carbon steel and aluminum Corosometer probes into samples of the retardants. The test was conducted at ambient temperatures and for a minimum test period of 100 hours. The following results were obtained.

Table 3

| Base solution | Viscous additive | Corrosion inhibitor | Corrosion rate, mils per year | |
|---|---|---|---|---|
| | | | Steel | Aluminum |
| 8-24-0 (6% phosphorus as polyphosphates). | None | None | Nil | 34.1 |
| 8-24-0 | do | do | Nil | 84.5 |
| 8-24-0 | do | 0.01% ammonium dichromate. | Nil | 62.4 |
| 8-24-0 | 0.5% Ca (as CaO) | None | 242 | 60.2 |
| 8-24-0 | do | 0.01% ammonium dichromate. | 165 | 22.1 |
| 8-24-0 | do | 0.04% ammonium dichromate. | 1.4 | Nil |
| 8-24-0 | do | 0.10% ammonium dichromate. | 0.0 | Nil |

The preceding data show that my fire retardants can be safely handled in carbon steel and/or aluminum containers.

The preceding discussion of fire retardant compositions is intended solely to illustrate the properties of these materials and is not to be construed as unduly limiting of my invention which is expressed in the compositions, and equivalents thereof, set forth in the following claims.

I claim:

1. A highly viscous and gelatinous fire retardant and extinguishant which comprises and aqueous composition of ammonium orthophosphate containing between about 2 and 35 weight percent phosphorous calculated as $P_2O_5$ and an ammonia content expressed as parts by weight of nitrogen per part of said phosphorous calculated as $P_2O_5$ between about 0.26 and about 0.39; and ammonium orthophosphate having a pH greater than 5.1 and less than 7.8 and containing between about 0.05 and 3.0 weight percent calcium calculated as the oxide as insoluble calcium orthophosphate to render said fire retardant viscous and gelatinous and between about 0.001 and about 0.05 weight percent of a soluble chromate salt.

2. The fire retardant of claim 1 which is derived from wet-process phosphoric acid and contains between about 1 and 10 weight percent of metallic impurities, comprising iron and aluminum, which are incident in said wet-process phosphoric acid.

3. The fire retardant of claim 1 wherein the concentration of said phosphorus is between about 4 and 24 weight percent calculated as $P_2O_5$.

4. The fire retardant of claim 1 which also contains between about 5 and 25 weight percent of an inert solid selected from the class of silica, alumina and clays.

5. The composition of claim 1 having a pH greater than about 6.0 and less than 7.8 and said ammonia content expressed as parts by weight of nitrogen per part of said phosphorus calculated as $P_2O_5$ between about 0.31 and about 0.39.

6. A highly viscous and gelatinous fire retardant and extinguishant which comprises and aqueous composition of ammonium orthophosphate, insoluble calcium orthophosphate and a soluble chromate salt; the concentration of phosphorus calculated as $P_2O_5$ in said composition being between about 4 and 24 weight percent; said composition having a pH between about 5.1 and 7.8 and containing between about 0.26 and 0.39 parts by weight of ammonia calculated as nitrogen per part of said phosphorus, between about 0.1 and 2.0 weight percent calcium calculated as CaO and between about 0.001 and 0.05 weight percent of a soluble chromate salt to render said solution substantially non-corrosive to ferrous metals.

7. The fire retardant of claim 6 that contains between 0.31 and 0.39 parts of nitrogen per part of phosphorus, expressed as parts by weight of nitrogen per part by weight of phosphorus calculated as $P_2O_5$.

8. A highly viscous and gelatinous fire retardant and extinguishant which comprises an aqueous ammonium orthophosphate containing between about 2 and 35 weight percent phosphorus calculated as $P_2O_5$ and an ammonium content expressed as parts by weight of nitrogen per part of said phosphorus calculated as $P_2O_5$, between about 0.26 and about 0.39; said ammonium orthophosphate having a pH greater than 5.1 and less than 7.8 and containing between about 0.05 and 3.0 weight percent calcium calculated as the oxide, present as insoluble calcium orthophosphate, in an amount sufficient to impart a substantial increase in viscosity to said fire retardant.

9. The fire retardant of claim 8 that contains between about 0.31 and 0.39 parts of nitrogen per part of phosphorus expressed as parts by weight nitrogen per part by weight of phosphorus calculated as $P_2O_5$.

References Cited by the Examiner

UNITED STATES PATENTS

| | | | |
|---|---|---|---|
| 2,155,045 | 4/1939 | Griffith et al. | 252—387 XR |
| 2,303,399 | 12/1942 | Schwartz | 252—387 XR |
| 2,773,757 | 12/1952 | Connell et al. | 252—317 XR |
| 2,852,341 | 9/1958 | Bell et al. | 23—107 |
| 2,858,895 | 11/1958 | Connell | 252—2 XR |
| 2,901,427 | 8/1959 | Steppe | 252—7 XR |
| 2,917,380 | 12/1959 | Franklin | 71—41 XR |
| 3,017,348 | 1/1962 | Steppe et al. | 252—7 XR |
| 3,057,711 | 10/1962 | Reusser et al. | 71—41 XR |

FOREIGN PATENTS 629,336  9/1949  Great Britain.

OTHER REFERENCES

"The Use of Chemicals in Forest Fire Controls," United States Department of Agriculture, Forest Service, Madison, Wis., 1939. Table I (between pp. 4 and 5) and p. 8.

"Chemical Fire-Fighters Blaze New Trails," Chemical Week, Oct. 7, 1961, pp. 39–40.

JULIUS GREENWALD, *Primary Examiner.*

ALBERT T. MEYERS, *Examiner.*

R. E. HUTZ, M. WEINBLATT, *Assistant Examiners.*